United States Patent Office 3,158,190
Patented Nov. 24, 1964

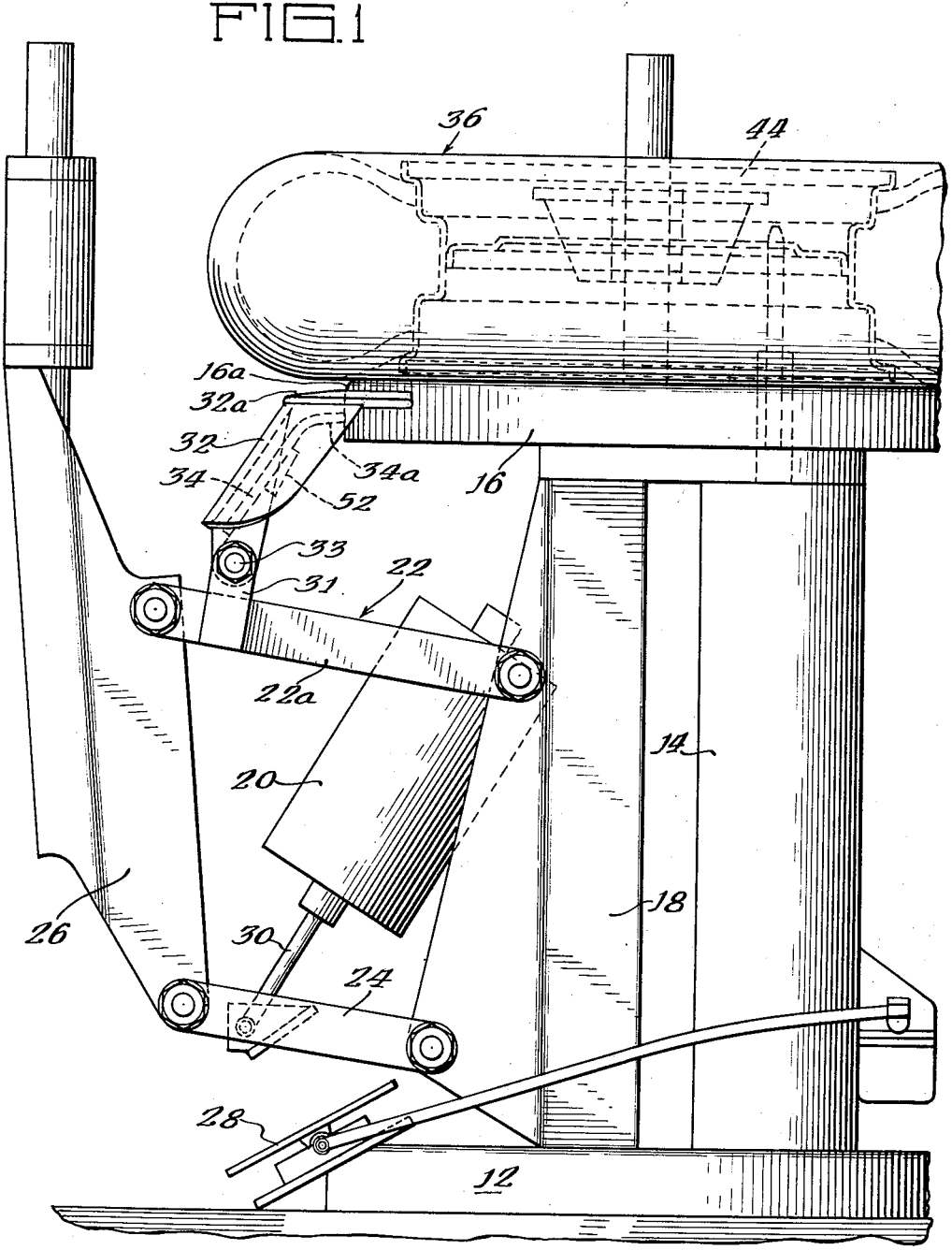

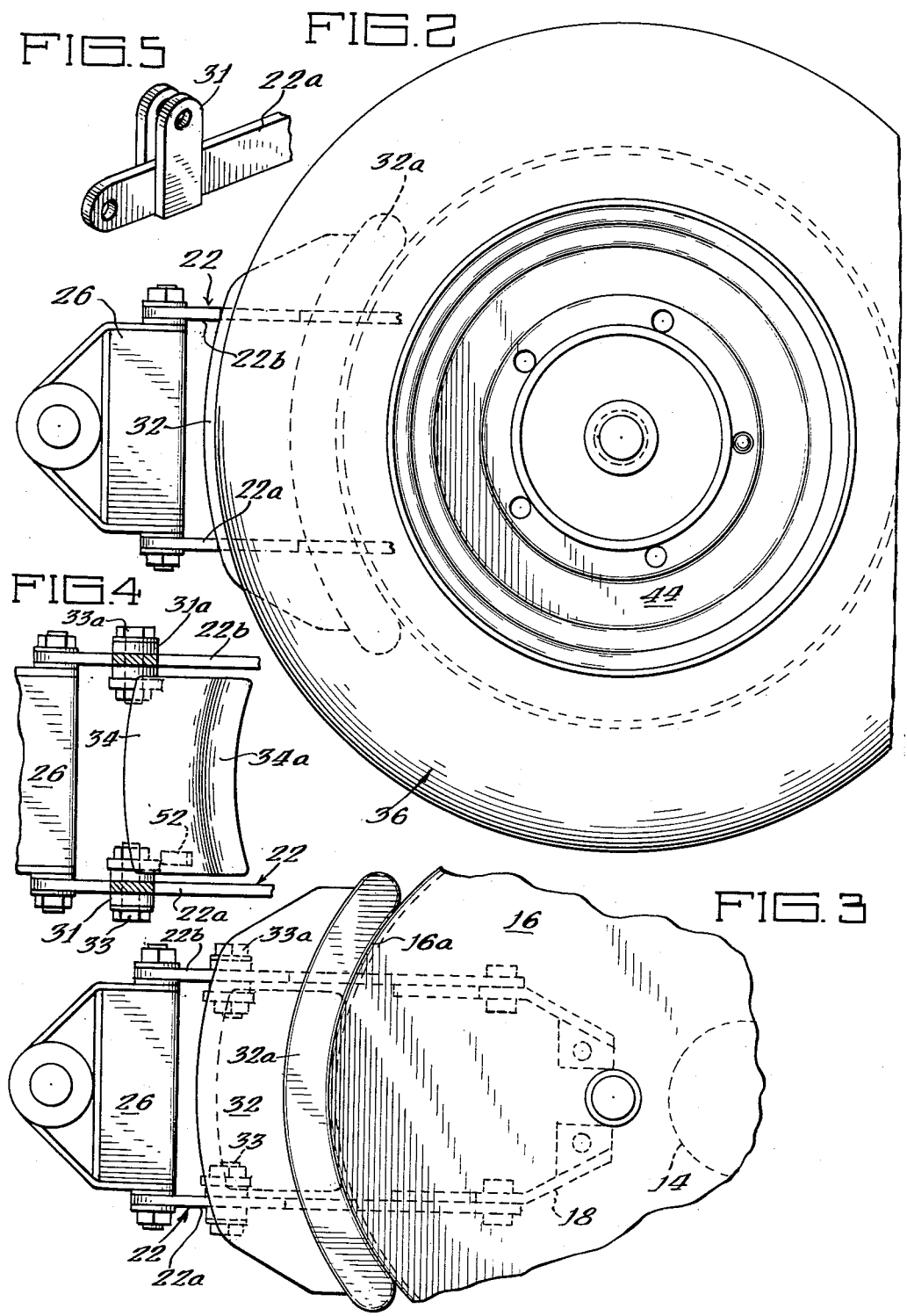

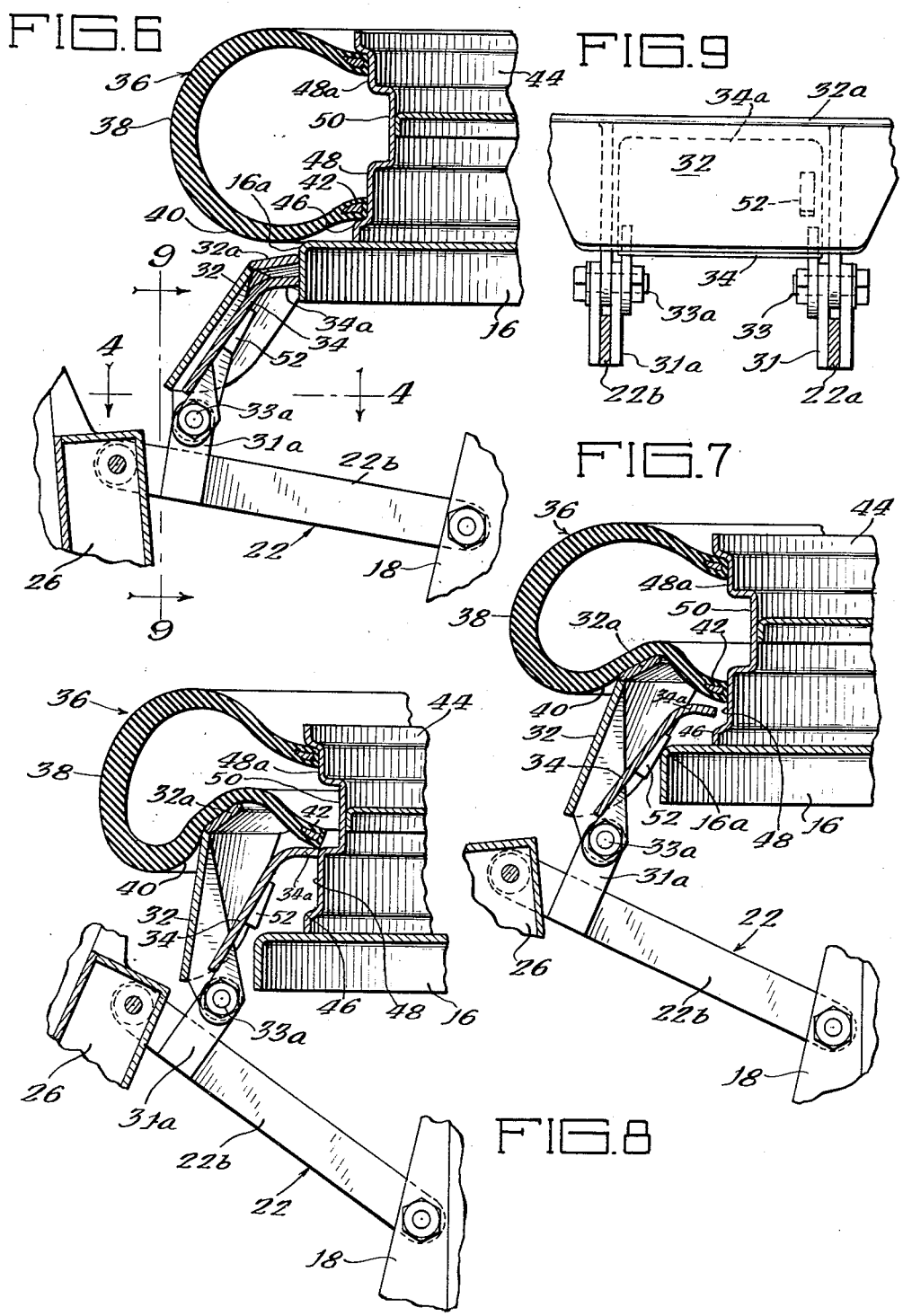

3,158,190
DOUBLE LOWER BEAD BREAKER SHOE FOR TIRE CHANGING STANDS
James R. Foster, Webster City, Iowa, assignor to The Coats Company, Inc., a corporation of Iowa
Filed Aug. 13, 1962, Ser. No. 216,508
8 Claims. (Cl. 157—1.17)

This invention relates to tire changing devices and more particularly to a device for breaking the seal between the tire bead and the tire rim.

Tire changing stands in current use have found a great deal of acceptance throughout the tire replacement field. Most service stations and tire replacement stores are equipped with such stands for rapid removal of tires from a tire rim. With the advent of the tubeless tire it was desirable to develop a tire changing stand wherein the seal between the tire bead and the rim could be loosened without damaging the sealing components of the tire bead. Further complicating the problem was the increase in width of the brake shoes and therefore, of the rim bead seat which fits over the brake shoe area. This meant that the tire bead had to travel a greater distance before being pushed into the drop center of the rim wherefrom the tire is removed. However, tire changing stands were developed wherein the bead breaking shoe was made of sufficient configuration and surface area so that it could break the seal between the tire bead and the tire rim and push the bead into the drop center of the rim with the application of pressure on the side wall of the tire casing.

Currently, the tire industry is initiating the production of two-ply tires as opposed to the formerly standard four-ply tire. Two-ply tires have a great deal more resilience in the side walls and it has been found that, when attempting to change such tires with the use of a tire stand as previously described, the shoe may experience a great deal of difficulty in breaking the bead of the tire from the tire rim and pushing it all the way to the drop center, due to this extreme resilience. Furthermore, standard passenger tires have internal radii ranging from 13 to 15 inches and some popular foreign cars have tires with even smaller internal radii. Thus it has become necessary to perfect a tire stand wherein the tire, regardless of the number of plies or internal radius thereof, may be loosened from its seal with the tire rim and forced into the drop center thereof by a pressure against the side wall of the casing.

It is therefore an object of this invention to provide a new and improved tire changing device.

It is another object of this invention to provide a new and improved tire changing device free from the objections mentioned above.

It is another object of this invention to provide a new and improved tire changing device which is adapted to break the seal between the tire bead and the tire rim by the application of pressure on the side wall of the tire casing regardless of the size of the tire or the number of plies thereof.

It is another object of this invention to provide a new and improved tire changing device having two lower bead breaking shoes, both of which push against the side wall of the tire casing to break the seal between the tire bead and the tire rim and push the bead into the drop center of the rim for tires of different sizes and different numbers of plies.

It is still another object of this invention to provide a tire changing device having a support means for the tire rim and the tire mounted thereon, a pair of shoes movable past one edge of the rim for breaking the seal between the tire and the rim; means for providing movement to the shoes; a tire engaging surface on the shoes, one shoe having its tire engaging surface movable past the rim to engage the side wall of the tire and move the tire towards the center of the wheel rim, and a second shoe having its tire engaging surface adapted to engage the side wall of the tire intermediate the first shoe and the juncture of the bead of the rim for cooperatively moving the tire toward the center of the rim so that the bead can be moved into the drop center thereof.

Other objects, features and advantages of the present invention will be apparent from the following description of the preferred embodiment of this invention as illustrated in the accompanying drawings, in which:

FIGURE 1 is a fragmentary side elevational view of a tire changing stand embodying this invention;

FIGURE 2 is a fragmentary top plan view of the device shown in FIGURE 1;

FIGURE 3 is a fragmentary top plan view of a device shown in FIGURE 1 with the tire removed therefrom;

FIGURE 4 is a fragmentary top plan view of one of the lower bead breaking shoes which forms a part of this invention;

FIGURE 5 is an isometric view of a strut linkage member for the bead breaking shoes of this invention;

FIGURE 6 is a fragmentary sectional view showing the bead breaking shoes prior to engaging a tire secured to a tire rim mounted on the tire changing device;

FIGURE 7 is a fragmentary sectional view similar to FIGURE 6 showing the bead breaking shoes in operation with the first lower bead breaking shoe pushing against the side wall of the tire casing and loosening the seal between the tire bead and the rim flange;

FIGURE 8 is a fragmentary sectional view similar to FIGURES 6 and 7 showing the bead braking shoes at a later stage of travel with the second lower bead breaking shoe aiding to push the tire bead over the brink of the rim into the drop center thereof; and FIGURE 9 is a fragmentary section view taken along the line 9—9 of FIGURE 6 showing a portion of the first lower bead breaking shoe.

As shown in FIGURE 1 the tire changer 10 of this invention includes a base member 12 on which is mounted a generally perpendicularly extending upright pedestal 14 which supports a generally horizontal rim supporting surface or table 16 spaced from the base 12. The table 16 is adapted to support tire rims for tires of different sizes, especially 13, 14 and 15 inch tires which are most commonly used on standard passenger vehicles. A cylinder mount 18 extends generally parallel to the upright standard 14 and mounted thereon is the power cylinder 20 and one end of associated strut and linkage assemblies 22 and 24 therefor. Each linkage assembly 22 and 24 consists of a pair of horizontally spaced parallel arms such as 22a and 22b. The opposite ends of the linkage assemblies 22 and 24 are secured to a portion of the upper bead breaking assembly 26 which is generally parallel to and laterally spaced from the cylinder mount and upright standard. Since this invention is only concerned with the lower bead breaking assembly the upper bead breaking assembly is not shown in detail and it is to be understood that any standard upper bead breaking shoe may form a part of the tire changer which embodies this invention.

The foot pedal 28 is provided at the base 12 for actuating the appropriate air valves for operating the power cylinder 20 in the desired fashion. The structure and operation of such a power cylinder and air valve in a tire changing stand is generally old in the art and therefore will not be discussed in detail. As can be readily seen from FIGURE 1, as the power cylinder piston 30 moves inwardly or outwardly from the power cylinder 20 it will cause the linkage assembly 24 to pivot about its mounting with the cylinder mount 18 imparting generally upright or vertical movement (relative to the table) to the upper bead loosening assembly 26. This then will cause substantially parallel movement in the linkage assembly 22 which is secured to both the cylinder mount 18 and the upper bead loosening assembly 26 generally parallel to and spaced from the lower linkage assembly strut 24.

The upper linkage assembly 22 has generally vertically extending lower shoe mounting struts 31 and 31a formed on each arm 22a and 22b, respectively. The outer lower bead breaking shoe 32 and inner lower bead breaking shoe 34 are each pivotally secured in vertical tandem to the shoe struts 31 and 31a at a common mounting 33 and 33a, respectively. Thus the aforementioned upright motion imparted to the lower linkage assembly 24 and transmitted to the upper linkage assembly 22 will be imparted as upright or vertical movement to the shoes 32 and 34, while allowing independent deviations from the generally upright movement for each shoe 32 and 34.

As shown in FIGURE 6, the conventional tire 36 has a road engaging or tread area 38, a side wall or casing portion 40 and a bead or sealing area 42. The tire is affixed to a rim 44 with an airtight seal existing between the tire bead 42 and the rim flange 46 as well as the rim bead seat 48. This seal is of prime importance with the advent of tubeless tires and thus such a seal is often extremely difficult to break when attempting to remove a tire from the rim. The bead seat 48 which fits over the brake drum area of an automobile has a greater width than the upper bead seat 48a. The tire and rim are usually mounted on the tire changing stand with the inner side of the rim and tire resting on the stand, as shown in these drawings. Thus it is more difficult for the lower bead to be broken and the tire to be pushed into the drop center 50 of the rim due to the greater distance that must be traveled by the lower bead. Since the tire is basically a circle mounted on a cylinder or drum, as the tire is pushed it cants on the drum, effectively reducing its interior circumference and creating a binding which resists movement toward the drop center 50 of the rim. It can be easily seen that this binding greatly impairs the movement of the bead into the drop center 50 across the inner or lower bead seat 48.

The tire engaging shoes 32 and 34 each have tire engaging surfaces 32a and 34a, respectively. These tire engaging surfaces normally are positioned adjacent the rim supporting table and have an arcuate configuration generally concentric with the tire rim. The tire engaging surface 32a of the shoe 32 is of a sufficient surface area to enable the shoe to cause the seal between the tire bead 42 and rim 44 to be broken by the exertion of pressure against the side wall 40 of the tire 36 when the shoe is moved thereagainst. In the preferred embodiment of this invention the tire engaging surface 34a of the shoe 34 is of lesser dimension than the tire engaging surface 32a. The surface 34a is of a sufficient dimension so that, when the surface 34a contacts the side wall of the tire in an area intermediate the shoe 32a and the tire bead 42, the shoes 32 and 34, in pushing conjointly against the side wall of the tire, will cause the tire bead to be moved along the rim bead seat 48 and into the rim drop center 50.

As shown in FIGURES 6–8, the tire engaging surface 32a of the outer lower shoe 32 contacts the side wall of the casing at approximately the mid-portion thereof and pushes substantially vertically upward thereupon. By exerting a constant pushing action on the tire the shoe 32 causes the seal between the tire bead and the rim flange and bead seat to be broken, as shown in FIGURE 7. The friction existing between the side wall of the tire and the tire engaging surface 32a prevents the shoe from substantially deviating from its generally vertically upward path and moving relative to the rim.

The inner lower shoe 34 is provided with a means for guiding the shoe relative to the rim support or cam follower 52 in the underside thereof. This cam follower is adapted to engage the edge 16a of the rim supporting surface or table 16 so that the inner lower shoe is guided thereby. This external control for the inner lower shoe insures that the tire engaging surface 34a of the shoe will engage the tire in the area intermediate the bead and the portion being contacted by the outer shoe, after the bead has been broken by the outer shoe. As the inner lower shoe moves upward it is continuously guided by the edge of the rim supporting table which acts as a cam for the cam follower 52 formed on the inner lower shoe 34. Thus the inner lower shoe also exerts a constant pushing action on the tire in an area spaced from the bead. The friction existing between the tire side wall and the tire engaging surface 34a also retains the shoe 34 on a substantially upright path so that the shoes 32 and 34, in contact with the tire rim, move conjointly to push the tire bead into the rim drop center under the influence of their associated linkages and power source.

The pushing action of the inner lower shoe under the guidance of the rim supporting table continues until the last moment before the bead is pushed over the brink into the rim drop center as shown in FIGURE 8. At that time the lower shoe may move laterally relative to the rim to push the tire bead over the brink of the bead supporting portion of the rim and into the drop center thereof.

This new and improved tire changing device incorporating a pair of lower bead breaking shoes overcomes present difficulties encountered in attempting to change tires with a great deal of side wall resiliency, such as the recently introduced two-ply tires. Furthermore, the device of this invention utilizes a second or inner lower bead breaking shoe which is guided by the tire supporting table so that the tire changer is capable of accommodating tires of different internal radii. Finally, with the aid of a second inner lower shoe the tire changer is capable of forcing the tire bead into the rim drop center of rims having bead supporting surfaces of increased width.

While I have shown and described certain embodiments of my invention, it is to be understood that it is capable of many modifications. Changes, therefore, in the construction and arrangement may be made without departing from the spirit and scope of my invention as set out in the appended claims.

I claim:

1. A device for removing a vehicular tire from a wheel rim of the drop center type, comprising: a support for a wheel rim with a tire casing thereon; a pair of shoes mounted on the support in position cooperatively to engage one side of the tire on said wheel rim; means for moving the pair of shoes against the tire for forcing the tire casing toward the drop center of the wheel rim, the first of said shoes being positioned to engage the side wall of the tire outwardly from the wheel rim and push such side wall toward the opposite side wall of the tire, the second shoe being positioned to engage the tire casing intermediate the first shoe and the juncture of the tire casing and wheel rim, and means for moving the shoes conjointly in said contact with the tire casing to push the tire bead into the drop center of the wheel rim.

2. The device of claim 1 wherein said second shoe is provided with guiding means engaging a portion of said device to guide the shoe past the wheel rim out of contact therewith during movement of the tire bead away from its seat on the tire rim.

3. A device for removing a vehicular tire from a wheel rim of the drop center type, comprising: a support for a wheel rim with a tire casing thereon; a pair of shoes mounted on the support in position to engage one side of the tire on said wheel rim; means for moving the pair of shoes against said one side of the tire for forcing the tire side wall toward the drop center of the wheel rim, said shoes being positioned to engage the tire casing in sequence with the first shoe contacting the tire side wall and pushing said side wall across the wheel rim so that the second shoe may engage the tire side wall intermediate the first shoe and the juncture of the tire casing and wheel rim; and means for moving the shoes conjointly in said contact with the tire side wall to push the tire bead into the drop center of the wheel rim.

4. The device of claim 3 wherein said second shoe is provided with guiding means engaging said support to guide the shoe into its engagement with the tire side wall out of contact with the wheel rim during movement of the tire bead away from its seat on the tire rim.

5. A device for removing a vehicular tire from a wheel rim of the drop center type, comprising: a support for a wheel rim with a tire casing thereon; mounting means on said device, said mounting means being movable in an upright direction relative to said table; a pair of shoes secured to said mounting means, said shoes having tire engaging surfaces normally adjacent to said support in a a position to engage one side of the tire casing, said shoes being positioned on said mounting means to engage the tire casing in sequence; means for moving said mounting means and forcing the first shoe tire engaging surface to contact the tire casing and push said casing across the wheel rim; guiding means for said second shoe for cooperating with said means for moving to guide said second shoe into contact with the tire casing intermediate the first shoe and the juncture of the tire casing and wheel rim and out of contact with the wheel rim during the movement of the tire bead away from its seat on the tire rim; and means for moving the shoes conjointly in said contact with the tire casing to push the tire bead into the drop center of the wheel rim.

6. The device of claim 5 wherein said guiding means includes a cam follower on said second shoe adapted to track on said support means to guide said shoe into engagement with the tire casing out of contact with the wheel rim during movement of the tire bead away from its seat on the wheel rim.

7. A device for removing a vehicular tire from a wheel rim having a drop center comprising: a generally upright pedestal; a substantially horizontal rim supporting table mounted on said pedestal; a pair of shoes mounted on said device and laterally spaced from said pedestal, said shoes having substantially arcuate tire engaging surfaces concentric with said rim supporting table and positioned adjacent thereto; means responsive to external actuation for moving the pair of shoes generally upright relative to said table and against one side of the tire for forcing the tire casing toward the tire rim; said first shoe having a tire engaging surface adapted to engage and move the tire side wall tending to break the sealing engagement of the tire bead with the tire rim, said second shoe having a tire engaging surface also adapted to engage the side wall of the tire casing after said first shoe has raised the side wall tending to break the seal between said tire and said rim, said second shoe being guided by said rim supporting table to cause said second tire engaging surface to contact said tire in an area intermediate the first shoe and the juncture of the tire casing and wheel rim; and means for moving the shoes together after each has engaged the tire side wall to force the tire bead into the drop center.

8. A device for removing a vehicular tire from a drop center wheel rim comprising: a generally upright pedestal; a substantially horizontal rim supporting table mounted on said pedestal; linkage means pivotally mounted on said device generally normal to said pedestal and movable in an upright direction relative to said table; a pair of shoes commonly pivotally mounted at one end of said linkage in upright tandem and extending upright generally normal thereto, said shoes having substantially arcuate tire engaging surfaces concentrically facing said rim supporting table and positioned adjacent thereto; a power cylinder on said device and responsive to external actuation for imparting movement to said linkage for moving said shoes generally upright relative to said table, said first shoe having a tire engaging surface adapted to engage the side wall of a tire secured to a wheel rim mounted on said table to break the sealing engagement of the tire bead with the tire rim under actuation of said first shoe; said second shoe having a tire engaging surface for engaging the tire side wall and also having a cam follower adapted to engage the edge of said supporting surface to guide said second shoe in its upright movement laterally inward relative to said first shoe to cause said second tire engaging surface to engage the side wall of said tire after said first tire engaging surface has broken said seal, the area of contact of said second tire engaging surface being intermediate said first shoe and the juncture of the tire casing and wheel rim, said first and second shoes being held in their relative areas of engagement with the tire side wall by the frictional forces existing therebetween so that said shoes may cooperatively engage the tire side wall after said second shoe engagement therewith to move the tire bead across the rim bead seat and into the drop center thereof.

References Cited in the file of this patent
UNITED STATES PATENTS

| | | |
|---|---|---|
| 2,581,086 | Edenfield et al. | Jan. 1, 1952 |
| 2,825,395 | Twiford | Mar. 4, 1958 |
| 3,032,095 | Brosene et al. | May 1, 1962 |

FOREIGN PATENTS

| | | |
|---|---|---|
| 706,756 | Great Britain | Apr. 7, 1954 |